United States Patent [19]

Silverman

[11] Patent Number: 4,621,551
[45] Date of Patent: Nov. 11, 1986

[54] TAILSTOCK QUILL HYDRAULIC CIRCUIT

[75] Inventor: Martin L. Silverman, South Euclid, Ohio

[73] Assignee: The Warner & Swasey Company, Cleveland, Ohio

[21] Appl. No.: 658,445

[22] Filed: Oct. 5, 1984

Related U.S. Application Data

[63] Continuation of Ser. No. 396,023, Sep. 13, 1982, abandoned.

[51] Int. Cl.⁴ .............................................. B23B 23/00
[52] U.S. Cl. .................................................... 82/31
[58] Field of Search ................................. 82/31, 40 R

[56] References Cited

U.S. PATENT DOCUMENTS

| | | | |
|---|---|---|---|
| 2,118,020 | 5/1938 | Curtis | 82/31 |
| 2,807,974 | 10/1957 | Meyer et al. | 82/40 R |
| 3,053,127 | 9/1962 | Montanus | 82/31 |
| 3,198,042 | 8/1965 | Binns | 82/31 |
| 3,943,803 | 3/1976 | Hafla | 82/31 |

FOREIGN PATENT DOCUMENTS 766765  9/1980  U.S.S.R. .................................. 82/31

*Primary Examiner*—Leonidas Vlachos
*Attorney, Agent, or Firm*—Yount & Tarolli

[57] ABSTRACT

A hydraulic circuit for use on a turning machine (10) having a quill (32) which is movable to an extended and retracted position for detecting, through pressure drop, when the quill (32) is fully retracted or extended and engaging a workpiece. The quill (32) is positioned by a hydraulic cylinder (40) which is operated from a hydraulic power supply (60). A pressure actuated switch (48) is connected to one of the operating ports on the hydraulic cylinder (40) and a orifice (70) is connected to the same port. By detecting when the pressure sensitive switch (48) is activated with respect to positioning of the hydraulic cylinder (40) proper functioning of the quill (32) can be determined. A timer (90) circuit is provided for determining that the pressure sensitive switch (48) changes position within a set time period after the hydraulic circuit is activated to change position of the quill (32).

2 Claims, 7 Drawing Figures

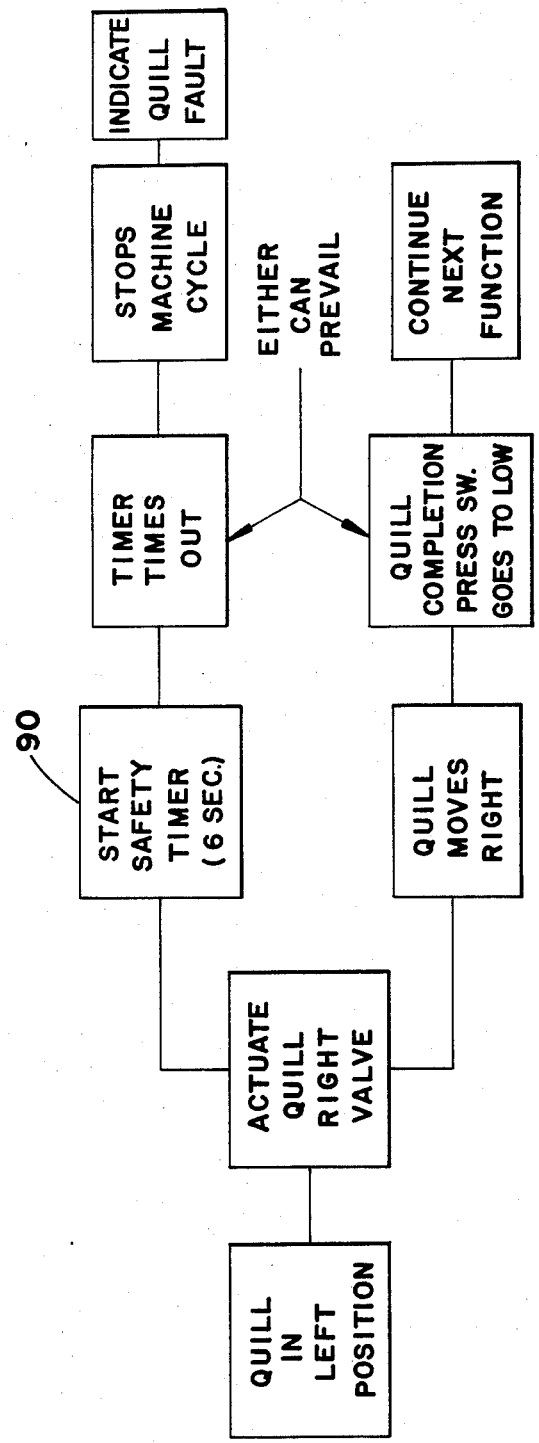

TAILSTOCK QUILL HYDRAULIC CIRCUIT

This is a continuation of co-pending application Ser. No. 396,023 filed on Sept. 13, 1982, abandoned.

BACKGROUND OF THE INVENTION

1. Technical Field

This invention relates to turning machines and more particularly to the hydraulic circuit for positioning a tailstock quill on a turning machine.

2. Background Art

Mechanical switches and timers have been utilized to determine when a quill is fully retracted or when a tailstock quill is properly engaging a workpiece before the turning machine is activated. Some prior art systems use a fixed timer which is set longer than the longest period of time it should take the quill to move. With a fixed timer set for example at six seconds, if the quill motion is complete in three seconds, then three seconds of valuable cycle time is lost while the machine waits for the fixed six second period to expire before moving on to the next operation.

DISCLOSURE OF THE INVENTION

The present invention provides a machine tool having a hydraulic circuit which detects starting and stopping of quill movement by monitoring pressure variations caused by movement of the actuating hydraulic cylinder. The controlled machine will commence the next operation immediately after completion of quill motion.

A turning machine having a tailstock which includes a movable quill for engaging and supporting one end of a workpiece is provided with a hydraulic circuit for positioning the quill and providing an indication when the quill is fully retracted and when the quill is properly engaging a workpiece. The hydraulic cylinder which is movable between an extended position, quill left, and a retracted position, quill right, is provided with a front or retract port; through which pressurized hydraulic fluid can be introduced to retract the hydraulic cylinder, and a rear or extend port, through which pressurized hydraulic fluid can be provided for extending the hydraulic cylinder. A hydraulic power supply having a source of pressurized hydraulic fluid and a return sump is provided. A four way two position valve connects the source of pressurized hydraulic fluid to one of the hydraulic cylinder ports and connects the other hydraulic cylinder port to the return sump. By activating the four way valve the ports to which the pressurized fluid is applied and the return sump connected can be reversed. Disposed in the hydraulic connections between the two way movable valve and the hydraulic cylinder are various hydraulic components for use in sensing and controlling the machine tool and its quill.

A pressure gage and pressure actuated switch are connected from the extend port on the hydraulic cylinder. Connected between the hydraulic cylinder and the four way valve is a small orifice which restricts flow between the four way valve and the extend port of the hydraulic cylinder. This orifice causes a back pressure when the hydraulic cylinder is forced into a retracted position which can be utilized by the pressure actuated switch to determine when the hydraulic cylinder is fully retracted and bottomed out. Also provided in the connection between the orifice and the extend port of the hydraulic cylinder is an adjustable pressure reducing valve and a parallel connected check valve, which allows unrestricted reverse flow. A pilot operated check valve is connected in series with the adjustable valve and its parallel check valve. The pilot operated check valve receives a pilot signal from the hydraulic line connected to the retract port of the hydraulic cylinder.

During operation when the quill is moved from a holding position to a retracted position hydraulic fluid is forced from the extend port and through the restricted orifice. The restrictive orifice keeps the pressure high enough so that the pressure actuated switch is maintained until the hydraulic cylinder is fully retracted. When the hydraulic cylinder is fully retracted the pressure actuated switch signals low. When the hydraulic cylinder is advanced the pressure actuated switch stays in a low signal position until the quill engages the workpiece and the pressure builds up closing the pressure actuated switch. A timer is also started when it is desired to extend or retract the quill. Under normal conditions the quill should be extended or retracted before the timer expires. If the quill is not extended or retracted the timer expires and independently shuts down the system.

BRIEF DESCRIPTION OF THE DRAWINGS

For a better understanding of the invention, reference may be had to the preferred embodiment exemplary of the invention shown in the accompanying drawings in which.

BEST MODE FOR CARRYING OUT THE INVENTION

Figure 1:
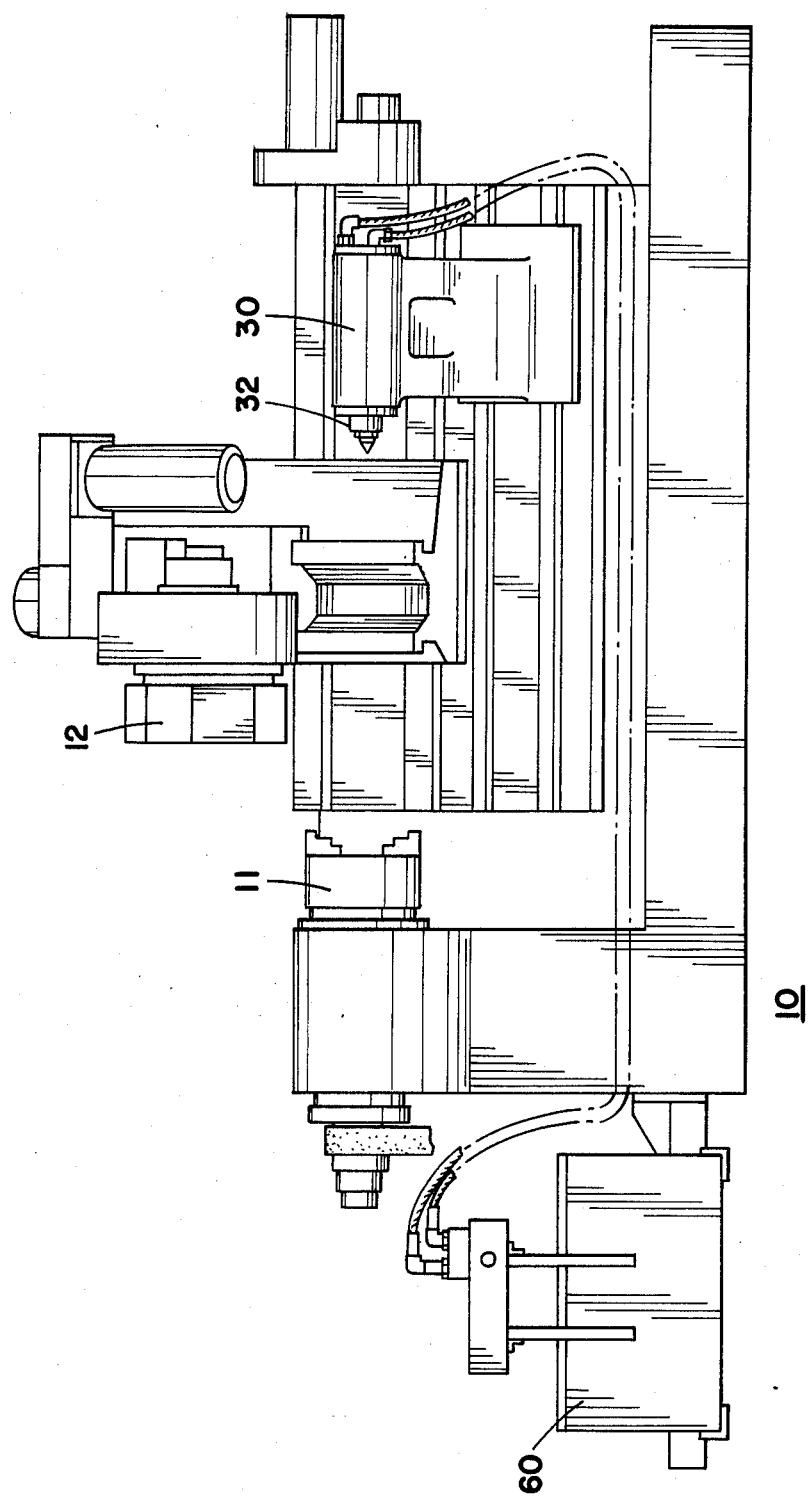
FIG. 1 is a view of a turning machine on which the present invention can be utilized.
Figure 2:
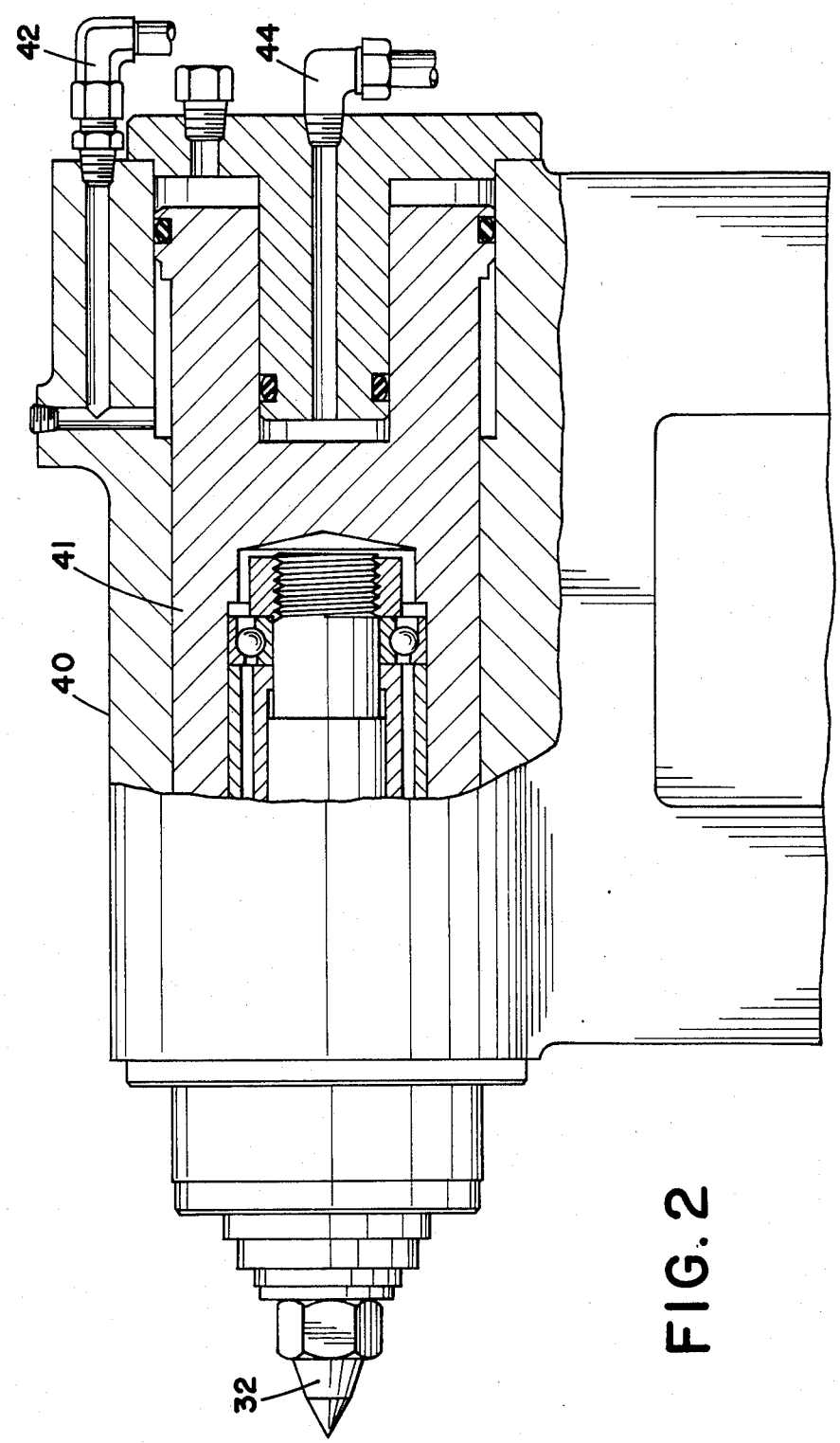
FIG. 2 is an enlarged view of a portion of the tailstock assembly on the turning machine of FIG. 1.

Refer now to the drawings, in FIGS. 1 and 2 there is shown a turning machine 10 utilizing the present invention. Turning machine 10 includes a driven head stock 11 which grips and rotates a workpiece 16 to be machined. Turret 12 which is supported for two axis movement brings selected tools into position with the workpiece for machining. A tailstock 30 is provided for engaging one end of relatively long workpieces to provide support during machining.

Tailstock 30 includes a quill 32 which is movable in and out between an extended position for engaging a workpiece and a retract position.

Referring to FIGS. 3 through 6 pressure actuated switch 48 acts as a quill complete detector for both direction. Quill 32 is positioned by hydraulic cylinder 40. Hydraulic cylinder 40 includes a front or retracting port 42 through which pressurized fluid can be introduced to move hydraulic cylinder 40, to a quill right, retracted position. A rear or extend port 44 is also provided through which pressurized fluid can be introduced to move hydraulic cylinder 40 to a quill left, extended position. When pressurized hydraulic fluid is introduced to either port 42 or 44 hydraulic fluid is forced from the opposite port as the piston 41 in the hydraulic cylinder 40 advances. Connected to respond to the pressure at extend port 44 is a pressure gage 46 and a pressure actuated switch 48. Pressure actuated switch 48 will close when the pressure at port 40 exceeds a predetermined value and will open when the pressure falls below this predetermined valve.

Figure 3:
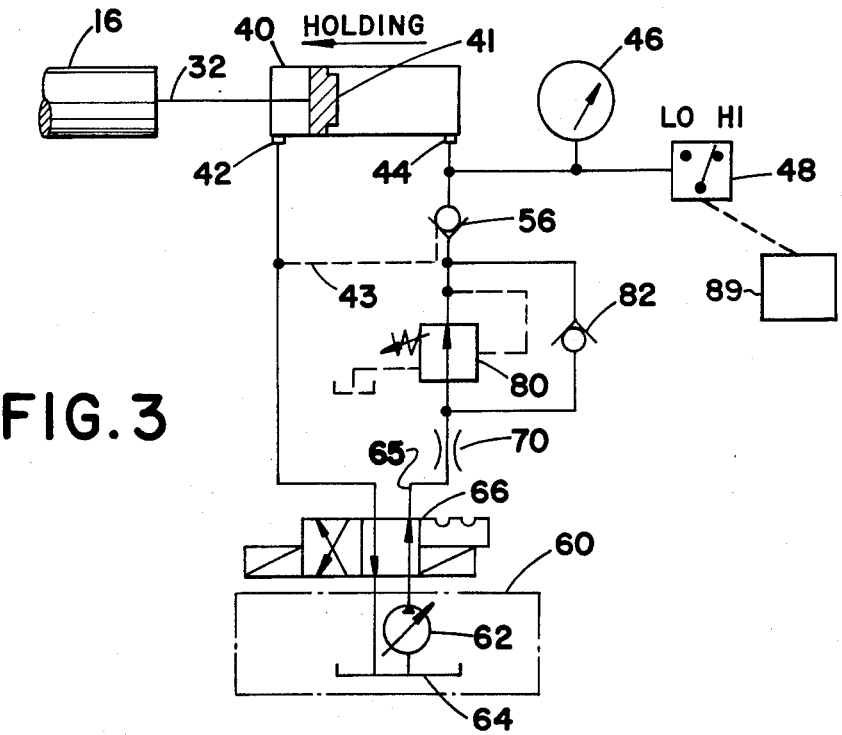
FIG. 3 is a hydraulic circuit of the present invention showing the tailstock quill extended and engaging a workpiece.

A hydraulic power supply 60 including a source of pressurized fluid 62 and a sump 64 is provided for operating hydraulic cylinder 40. Hydraulic power supply 60 can either be of a variable displacement type pump as shown or a fixed displacement pump with a pressure relief valve. A four way solenoid operated valve 66 is connected to control flow of the pressurized and return hydraulic fluids between hydraulic power supply 60 and hydraulic cylinder 40. When the four way valve 66 is in position as shown in FIG. 3, port 44 is connected by a valve arrangement and conduit 65 to the source of pressurized hydraulic fluid 62 and port 42 is connected to the hydraulic sump 64. When solenoid actuated valve 66 is operated to the position shown in FIG. 4 the pressurized supply is connected to port 42; and, port 44 through various hydraulic circuit elements is connected to the return sump 64.

Figure 4:
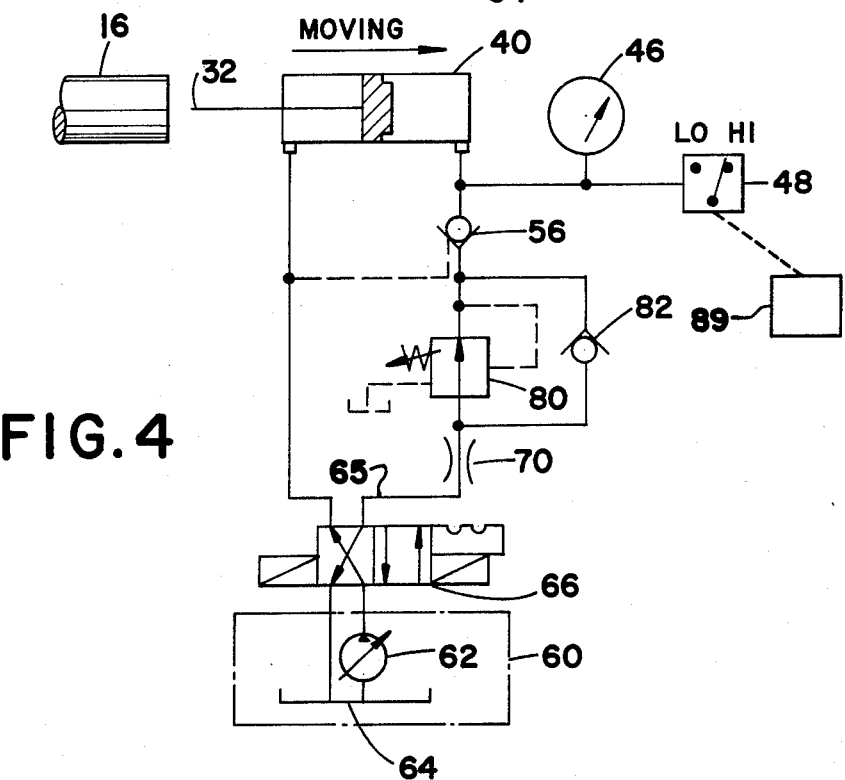
FIG. 4 is the hydraulic circuit of FIG. 3 showing the tailstock quill moving to the retracted position.
Figure 5:
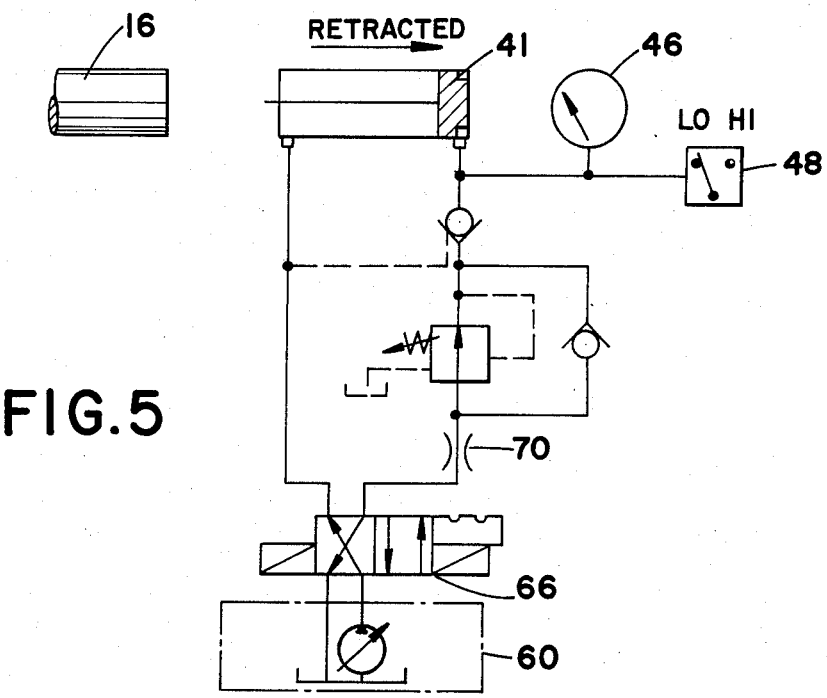
FIG. 5 is the hydraulic circuit of FIG. 3 showing the tailstock quill fully retracted.

A relatively small orifice 70 is provided for restricting the flow rate between the extend port 44 and the hydraulic power supply 60. When the hydraulic cylinder 40 is being moved to a retracted position as shown in FIG. 4 the pressurized supply 62 is connected to port 42. This forces piston 41 to the right and the contained hydraulic fluid on the right side of hydraulic cylinder 40 is forced from port 44 through the restrictive orifice 70 to return sump 64. Orifice 70 restricts the flow and causes a back pressure which maintains switch 48 at an activated or Hi condition. When hydraulic cylinder 40 reaches a fully retracted position as shown in FIG. 5 the flow through orifice 70 ceases and the pressure sensed by the pressure activating switch 48 is nearly the same as the return sump 64. Pressure actuated switch 48 thus moves to a Lo or deactivated position. Also, disposed in the connection from port 44 is a pilot operated check valve 56. The pilot signal for check valve 56 is derived from a line 43 which is connected to the line feeding port 42. Check valve 56 will thus not permit flow therethrough until pressure in line 43 exceeds the required pilot value setting.

Pilot check valve 56 acts as a safety device to maintain the quill extended and engaging a workpiece even if system pressure is lost. The quill complete detector as described will still function without pilot operated check valve 56. Check valve 56 performs the independent, but important, function of maintaining quill holding pressure should a power failure occur while a workpiece 16 is held in the rotating spindle. This safety function can be accomplished in several different ways. For example, a check valve could be provided before control valve 66 with a relief valve to interrupt the drain line from reducing valve 80.

A pressure reducing valve 80 is disposed between orifice 70 and check valve 56. A check valve 82 is provided in parallel around pressure reducing valve 80. Pressure reducing valve 80 is used to regulate the part holding force by regulating the pressure of the hydraulic fluid applied to cylinder 40. Valve 80 regulates the applied hydraulic fluid pressure to a valve equal to or less than the system pressure of 850 psi.

During operation the quill complete pressure switch 48 is set below the lowest pressure at which the system will ever be actuated but higher than the drag pressure created by the seal function and link losses. For example if 250 psi is selected as the lowest operating quill pressure then pressure switch 48 is connected to shut down machine tool 10 if pressure falls below approximately 175 psi. Pressure sensitive switch 48 indicates both when the quill is engaging a workpiece and when the quill is fully retracted. If a part is being held and the quill advance activated, the circuit would be as shown in FIG. 3. Gauge 46 will indicate quill pressure and pressure switch 48 would be over the 175 psi setting and in the Hi or activated position. If valve 66 is then energized to the position as shown in FIG. 4, the quill will start to retract. As the quill is retracting the pressure switch 48 sees approximately the system pressure because of back pressure created by the relatively small orifice plug 70. As shown in FIG. 7 when valve 66 is activated to be in the position as shown in FIG. 4 and the pressure switch 48 is activated the machine controller 89 knows the quill 32 is retracting.

When the quill 32 is fully retracted as shown in FIG. 5 the piston is bottomed in cylinder 40 and the pressure is now backed up only from this point. No flow is going through orifice 70 so no pressure drop is created. Pressure switch 48 is in free communication with the return tank sump, and the pressure falls below 175 psi and switch 48 opens indicating the quill is fully retracted. The controller 89 then knows that the quill is fully retracted. When switch 66 is energized to cause the quill to move to a retracted position a timer 90 is also started. Under normal operation the quill 32 will bottom before the time set on safety timer 90 expires. If the quill does not bottom opening pressure switch 48, before the timer 90 expires the system is shut down. Timer 90 is also utilized when the quill is extended to stop the machine cycle if switch 48 is not in a Hi position within the set time period.

Timer 90 which is set at about 6 seconds is started when solenoid valves 66 is actuated to move the quill right or to a retracted position. The controller 89 which is provided with machine tool 10 monitors timer 90 and pressure switch 48. The quill 32 should move to the retracted position in about 3 to 4 seconds under normal operation. If due to some system malfunction timer 90 expires before the pressure at switch 48 falls to a Lo value the controller will indicate a fault and shut the system down. If the system is operating normally and the pressure transition is observed in less than 6 seconds the controller 89 will reset timer 90 and move onto the next control operation immediately.

Figure 6:
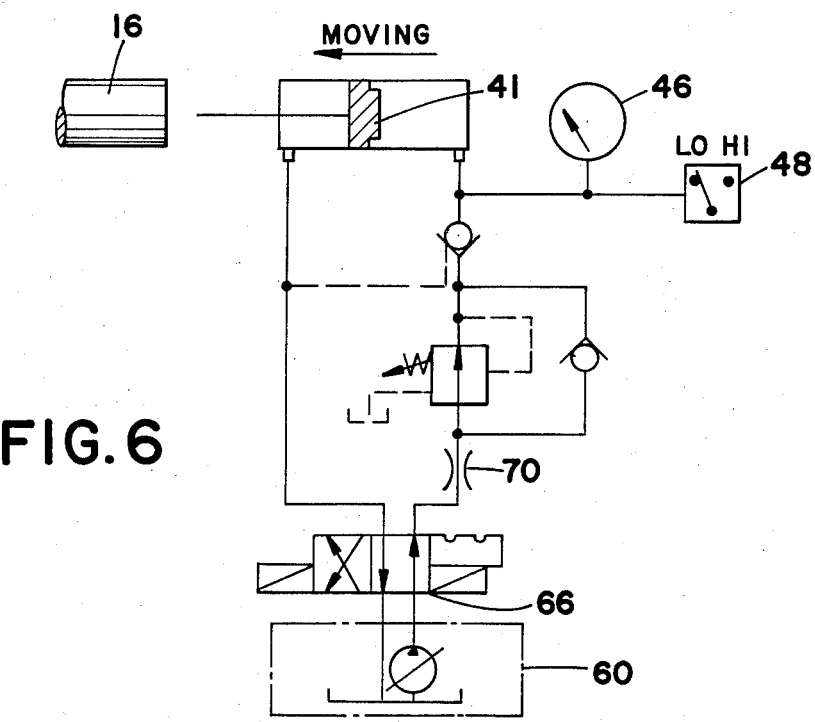
FIG. 6 is the hydraulic circuit of FIG. 3 showing the tailstock quill moving to the extended position; and, FIG. 7 is a block diagram of the timer circuit which operates with the quill positioning.

To cause the quill to engage a workpiece 16 the solenoid switch 66 is energized as shown in FIG. 6. As the piston 41 moves left the pressure is backed up only from the small orifice. The only pressure seen by pressure switch 48 is due to piston seal drag and some line loss. This pressure is not enough to exceed 175 psi and pressure switch 48 remains open. Thus, if valve 66 is energized to the position as shown in FIG. 6 and pressure switch 48 is not activated the controller 89 knows not to enable the turning machine to start cutting. If the time period set on timer 90 expires and pressure switch 48 is not activated the controller will automatically stop the machine cycle. Once the quill engages the part, pressure backs up from piston 41 and pressure switch 48 will see the quill set pressure and will close. At this time the turning machine can be permitted to operate.

Another safety feature of the disclosed system is that it will automatically shut down and indicate a fault if the quill is either extended or retracted and the pressure switch 48 changes state without any control command to move position.

I claim:

1. A machine tool comprising a headstock means (11) for gripping and rotating a workpiece, a tailstock quill (32) for supporting one end of the workpiece as it is rotated by said headstock means, fluid motor means (40) for moving said quill between a retracted condition in which said quill is ineffective to support the workpiece and an extended condition in which said quill supports one end of the workpiece, said fluid motor means including first and second motor chambers, conduit means (65) for conducting fluid flow to and from said fluid motor means during movement of said quill between said retracted and extended conditions, said conduit means including first conduit means for transmitting fluid pressure to said first motor chamber during operation of said fluid motor means to move said quill from the retracted condition to the extended condition and second conduit means for transmitting fluid pressure to said second motor chamber during operation of said fluid motor means to move said quill from the extended condition to the retracted condition, check valve means (56) connected with said first conduit means and operable from an open condition to a closed condition to block fluid flow from said first motor chamber in the event of a reduction in fluid pressure in a portion of said first conduit means during a machining operation with said quill in the extended condition, means for conducting fluid pressure from said second conduit means to said check valve means to maintain said check valve means to the open condition under the influence of the fluid pressure in said second conduit means during operation of said fluid motor means to move said quill from the extended condition to the retracted condition, orifice means (70) for restricting fluid flow to said first motor chamber during operation of said fluid motor means to move said quill from the retracted condition to the extended condition and for restricting fluid flow from said first motor chamber during operation of said fluid motor means to move said quill from the extended condition to the retracted condition, valve means (66) for directing fluid flow through said conduit means to said fluid motor means to effect operation of said fluid motor means to move said quill between the retracted and extended conditions, said fluid motor means, conduit means and valve means cooperating to change the fluid pressure in at least a portion of said conduit means upon movement of said quill to either the extended condition or a retracted condition, fluid pressure sensing means (48) connected in fluid communication with said conduit means for detecting the change in fluid pressure which occurs when said quill reaches the extended condition upon completion of movement of said quill from the retracted condition to the extended condition and for detecting the change in fluid pressure which occurs when said quill reaches the retracted condition upon completion of movement of said quill from the extended condition to the retracted condition, and control means (89) for initiating a machine tool function in response to said fluid pressure sensing means detecting a change in fluid pressure upon movement of said quill to the extended condition and for initiating a machine tool function in response to said fluid pressure sensing means sensing a change in fluid pressure upon movement of said quill to the retracted condition.

2. A machine tool as set forth in claim 1 further including pressure regulating valve means (80) connected in fluid communication with said first motor chamber for limiting the maximum fluid pressure in said first motor chamber to a fluid pressure which is less than a predetermined fluid pressure.

* * * * *